United States Patent
Lee

(10) Patent No.: US 7,389,039 B2
(45) Date of Patent: Jun. 17, 2008

(54) METHOD OF MANAGING AND PLAYING TITLE OF MEDIUM, MEDIUM, AND MEDIUM DRIVE

(75) Inventor: Sang-am Lee, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 859 days.

(21) Appl. No.: 10/778,315

(22) Filed: Feb. 17, 2004

(65) Prior Publication Data

US 2004/0221321 A1 Nov. 4, 2004

(30) Foreign Application Priority Data

Feb. 18, 2003 (KR) .................. 10-2003-0010043

(51) Int. Cl.
*H04N 5/91* (2006.01)
*G11B 27/02* (2006.01)
(52) U.S. Cl. .................. 386/95; 385/46; 385/52; 385/106; 385/109; 385/125; 360/13
(58) Field of Classification Search .................. 386/46, 386/52, 55, 94, 95, 105–112, 124, 125; 360/13, 360/15; 375/240.26
See application file for complete search history.

(56) References Cited

U.S. PATENT DOCUMENTS 6,289,166 B1 * 9/2001 Uno et al. .................. 386/46

FOREIGN PATENT DOCUMENTS

| JP | 11-232840 | 8/1999 |
| JP | 11-317056 | 11/1999 |
| JP | 2000-030414 | 1/2000 |
| JP | 2000-339929 | 12/2000 |
| JP | 2001-057055 | 2/2001 |
| JP | 2001-076462 | 3/2001 |
| JP | 2003-331526 | 11/2003 |
| KR | 2000-0004860 | 1/2000 |

* cited by examiner

*Primary Examiner*—Thai Q. Tran
*Assistant Examiner*—Mishawn Dunn
(74) *Attorney, Agent, or Firm*—Staas & Halsey LLP

(57) ABSTRACT

A method of managing and playing a title of a medium, the medium playing a deleted video title set (VTS) even after finalization of recording of a medium. The medium includes a first area recording video title sets and a second area recording search information used to play a deleted video title set among video title sets that have been recorded to the first area before recording of the medium is finalized.

37 Claims, 8 Drawing Sheets

METHOD OF MANAGING AND PLAYING TITLE OF MEDIUM, MEDIUM, AND MEDIUM DRIVE

CROSS-REFERENCE TO RELATED APPLICATIONS

This application claims the benefit of Korean Patent Application No. 2003-10043, filed on Feb. 18, 2003, in the Korean Intellectual Property Office, the disclosure of which is hereby incorporated by reference.

BACKGROUND OF THE INVENTION

1. Field of the Invention

The present invention relates to managing and playing a title of a medium, and more particularly, to methods of managing and playing a title deleted from a medium, the medium, and a medium drive thereof.

2. Description of the Related Art

FIG. 1 illustrates a data structure of a typical digital versatile disc (DVD) in accordance with the Independent System Operator (ISO) Specification. The data structure includes a lead-in (LI) zone, a volume/file system (VOL/FS) zone, a video manager (VMG) zone, an n-video title set (VTS #1-VTS #n) zone, a blank space BLANK SPACE into which data is not recorded, and a lead-out (LO) zone. The blank space may not be present in the data structure according to a capacity of a medium and the number of video title sets in the data structure.

The VMG is a table of contents (TOC) for the VTS #1-VTS #n and includes a VMG information (VMGI) file, a VMG_Menu$_{13}$ Video Object Set (VMGM_VOBS) file, and a VMGI_BackUp (VMGI_BUP) file.

The VMGI file is a control data file and includes static information needed for playing a title of the medium and information needed for supporting a user operation. Thus, the VGMI file includes a VMGI management table (VMGI_MAT) storing a start address of the VMGM_VOBS file (VMGM_VOBS_SA) and a VTS attribute table (VTS_ATRT) indicating the number of all VTS #1-VTS #n present in the medium.

The VMGM_VOBS file is a collection of video objects (VOs) and is comprised of video data, audio data, and sub-picture data. The VMGI_BUP file is a backup file of the VMGI file.

The VTS is a set of titles, and the number of titles may be up to 99 in accordance with the ISO Specification. Thus, "n" is an integer less than 99. Titles VTS #1-VTS #n include a VTS information (VTSI) file, a VTS Menu_VOBS (VTSM_VOBS) file, a Video Object set for Title set Title_VOBS (VTSTT_VOBS) file, and a VTSI_BackUp (VTSI_BUP) file.

The VTS information (VTSI) file is information for title management and includes a VTSM_VOBS_Start_Address (VTSM_VOBS_SA), a VTSI Management Table (VTSI_MAT), and a VTS_Part_of_Title_SeaRch_Pointer_Table (VTS_PTT_SRPT). The VTSM_VOBS file is a collection of VOs for the VTSM and includes video data, audio data, and sub-picture data. The VTSTT_VOBS file includes titles of data stored in the VTSM_VOBS file. The VTSI_BUP file is a backup file of the VTSI file.

As described above, the DVDs can record 99 titles at the maximum for play compatibility. Thus, if a user desires to record data to a blank space of the medium recording 99 titles, the user must delete a previously recorded title.

The user can delete the title recorded on the medium using a user interface at any time before finalizing recording of the medium.

If the user requests deletion of the previously recorded title before finalizing recording of the medium, a VMG and a file system (FS) that do not include information about the deleted title are created and recorded to the medium when the user finalizes the medium. For example, if the user requests deletion of the VTS #2 and VTS #3 before finalizing recording of the medium, the VMG and the FS that do not include information about the VTS #2 and VTS #3 are created and recorded to the medium when the user finalizes recording of the medium. Thus, the user cannot play a title that has been previously recorded before finalizing recording of the medium, e.g., the VTS #2 and VTS #3, and in addition, the user cannot know which title has been deleted.

SUMMARY OF THE INVENTION

The present invention provides methods of managing and playing a title of a medium, which allow a user to play a title which has been deleted during a recording operation of the medium even after finalizing the recording operation of the medium, the medium, and a medium drive thereof.

According to one aspect of the present invention, there is provided a medium comprising a first area recording video title sets and a second area recording search information used to play a deleted video title set among video title sets that have been recorded on the first area before recording of the medium is finalized.

According to another aspect of the present invention, there is provided a medium comprising a first area recording first data in units of video title sets and a video manager (VMG) zone recording second data including the search information used to search for a deleted video title set from the medium before recording of the medium is finalized.

According to still another aspect of the present invention, there is provided a method of managing a title of a medium on which data is recorded in units of video title sets, the method comprising recording information used to play a to-be-deleted video title set to an area of the medium if a user requests deletion of at least one video title set from the medium and creating video manager (VMG) data including search information on the area and recording the created VMG data on the medium if the user requests finalization of recording of the medium.

According to yet another aspect of the present invention, there is provided a method of managing a title of a medium on which data is recorded in units of video title sets, the method comprising storing information to play a to-be-deleted video title in a memory included in a medium drive on which the medium is loaded if a user requests deletion of at least one title set from the medium, reading the information from the memory and recording the information on an area of the medium if the user requests finalization of recording of the medium, and creating video manager (VMG) data including search information on the information and recording the VMG data on the medium.

According to yet another aspect of the present invention, there is provided a method of playing a title of a medium to which data is recorded in units of video title sets and information to play deleted video titles, the method comprising determining whether a deleted video title set on the medium is present based on data recorded on a video manager (VMG) zone of the medium, informing a user of the presence of the deleted video title set if the deleted video title set is present, and playing the deleted video title set based on the information if the user requests playing of the deleted video title set.

According to yet another aspect of the present invention, there is provided a medium drive that drives a medium on which data is recorded in units of video title sets, the drive comprising a pickup unit recording the data on the medium and reading the data recorded on the medium, a servo unit controlling movement of the pickup unit on the medium, and a system control unit creating information to play a video title set deleted from the medium and transmitting the created information to the pickup unit while controlling the servo unit to record the created information on a blank space of the medium.

According to yet another aspect of the present invention, there is provided a medium drive that drives a medium on which data is recorded in units of video title sets, the drive comprising a pickup unit recording the data on the medium and reading the data recorded on the medium, a servo unit controlling movement of the pickup unit on the medium, a memory storing search information used to search for a video title set among video title sets deleted from the medium, and a system control unit storing the search information in the memory if a user requests deletion of a video title set from the medium, creating video manager (VMG) data including the search information stored in the memory, and transmitting the VMG data to the pickup unit during finalization of recording of the medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
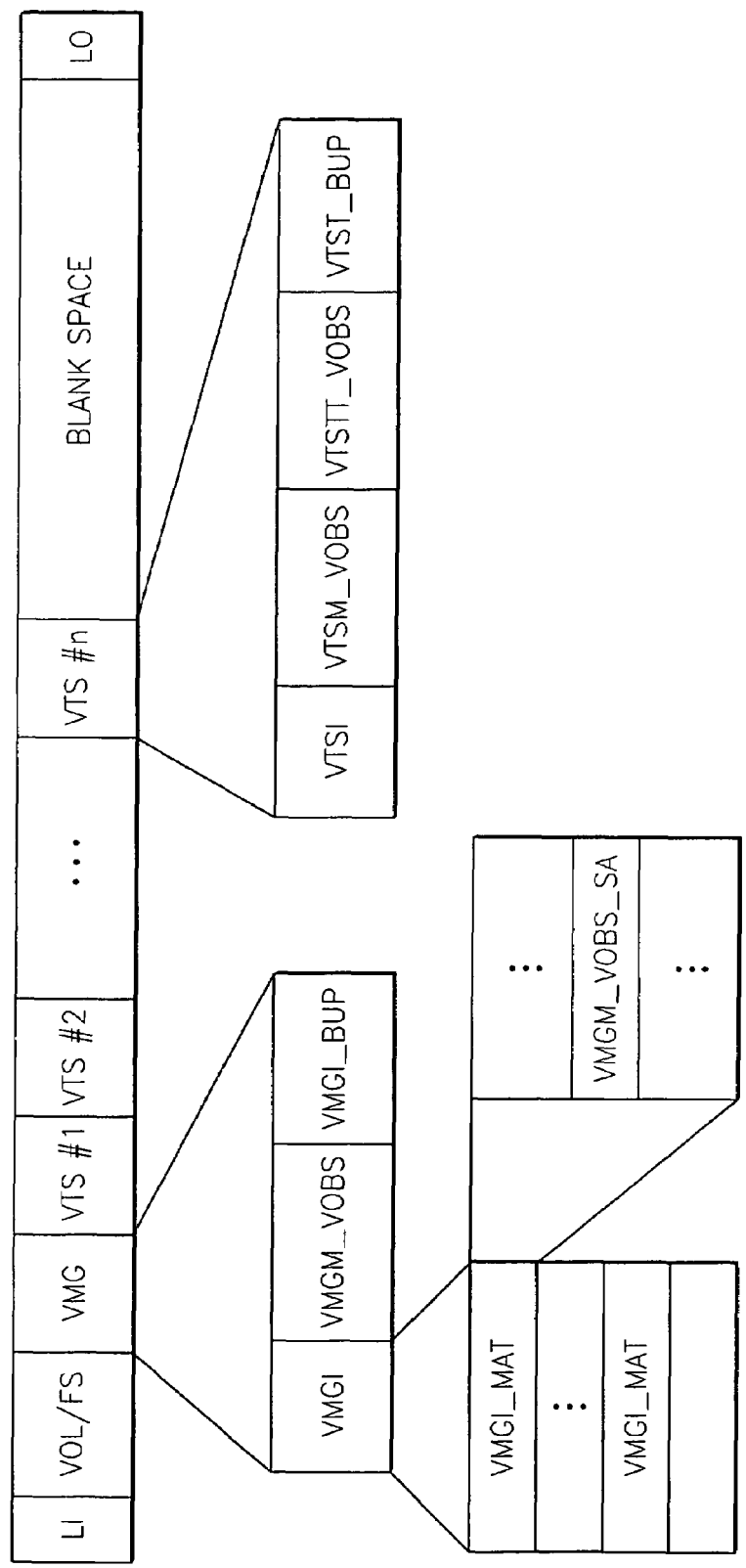
FIG. 1 illustrates a data structure of a typical digital versatile disc (DVD)

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
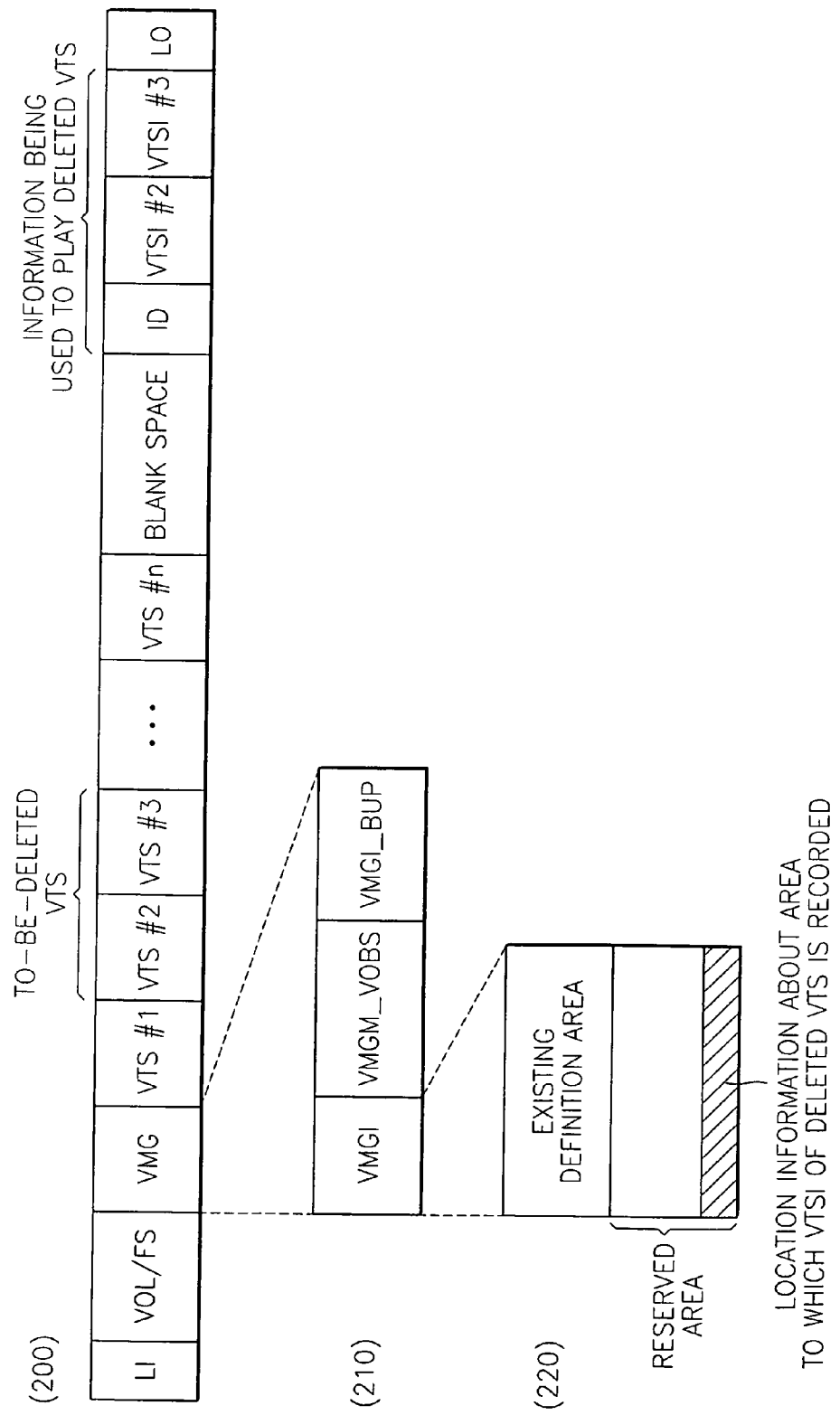
FIG. 2 illustrates a data structure of a medium according to an embodiment of the present invention.

FIG. 2 illustrates a data structure of a medium according to an embodiment of the present invention. The data structure of the medium includes a data structure of a volume space of the medium 200, a data structure of a Video Manager 210 (hereinafter, referred to as a VMG), and a data structure of VMG Information 220 (hereinafter, referred to as VMGI).

With respect to the volume space of the medium 200 if a user requests deletion of a video title set (hereinafter, referred to as a VTS) #2 and a VTS #3, VTS information (hereinafter, referred to as VTSI) #2 and VTSI #3 of the VTS #2 and VTS #3 are recorded to a blank space of the medium. The VTSI is information used to play the deleted VTS. The VTSI #2 and the VTSI #3 respectively have the same contents as VTSI that have already been recorded to the VTS #2 and the VTS #3.

"ID" shown in 200 of FIG. 2 denotes identification information indicating that the VTSI #2 and the VTSI #3, which are recorded to the blank space of the medium, are the VTSI of the deleted VTSs, i.e., the VTS #2 and VTS #3. Whenever the user requests deletion of a VTS, the VTSI of the to be deleted VTS may be recorded to the blank space of the medium. However, when the user requests finalization of recording of the medium or opening of the medium drive, the VTSI of the to-be-deleted VTS may be recorded to the blank space of the medium before recording of the medium is finalized or the medium drive is opened.

After the user finalizes recording of the medium where deletion of the VTS #2 and VTS #3 is requested, the VMGI of the VMG may have a data structure as shown in 220 of FIG. 2. In other words, a reserved area of the VMGI is used to record location information about an area to which the VTSI of the deleted VTSs, i.e., the VTS #2 and VTS #3, is recorded. In FIG. 2, the location information denotes a start address of an area to which the ID in 200 of FIG. 2 is recorded. Thus, the ID can be found using the location information recorded to the reserved area of the VMGI.

When the recording of the medium is finalized, both the location information and the flag information indicating the presence or absence of a deleted VTS in the medium may be recorded on the reserved area of the VMGI of the VGM. If the flag information is set to '1' when the deleted VTS is present in the medium, the flag information is set to '0' when the deleted VTS is absent from the medium.

Figure 3:
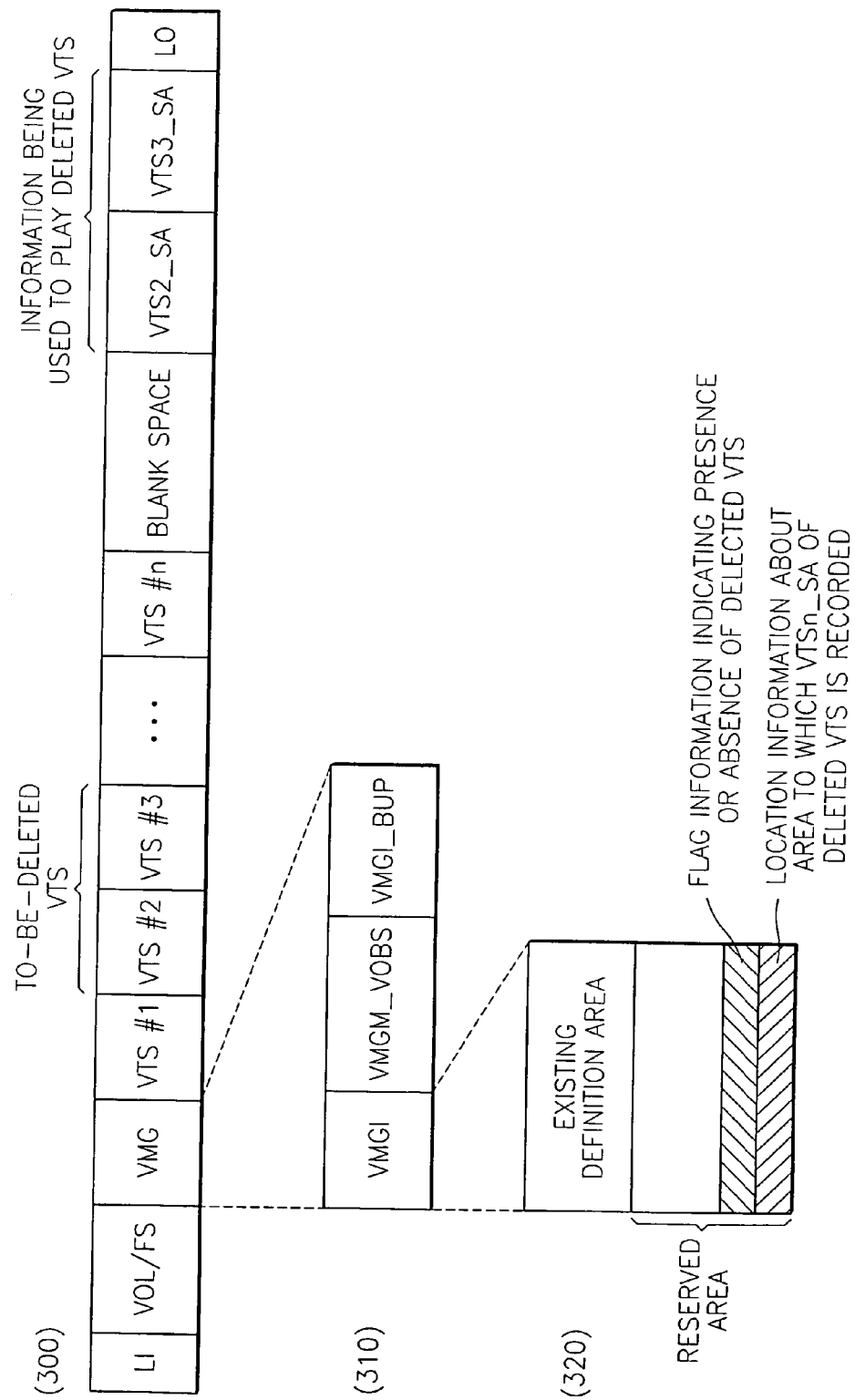
FIG. 3 illustrates a data structure of a medium according to another embodiment of the present invention.

FIG. 3 illustrates a data structure of a medium according to another embodiment of the present invention. The data structure of the medium includes a data structure of a volume space of the medium 300, a data structure of a VMG 310, and a data structure of a VMGI 320.

As shown in the data structure of the volume space of the medium 300 of FIG. 3, start addresses VTS2_SA and VTS3_SA of the VTS #2 and VTS #3 are recorded on the blank space of the medium. The blank space to which the start addresses are to be recorded may be a blank space on the medium such as the area to which the VTSI #2 and the VTSI #3 are recorded as shown in 200 of FIG. 2. The start addresses may be recorded to the medium whenever the user requests deletion of a VTS or when the user requests finalization of recording of the medium or opening of the medium drive. The start addresses are information used to play the deleted VTS.

In addition, not only the start address of a to-be-deleted VTS but also search information about the deleted VTS as the end address of the to-be-deleted VTS can be recorded to the blank space of the medium.

The VMG of the medium may have a data structure as shown in 310 of FIG. 3. In other words, the reserved area of the VMGI of the VMG includes flag information indicating the presence or absence of the deleted VTS in the medium and the location information about an area to which search information about the deleted VTS is recorded. The location information included in the reserved area of the VMGI denotes the start addresses of the VTS2_SA and VTS3_SA in 300 of FIG. 3A. Thus, the VTS2_SA recorded to the medium can be found using the location information about the area to which the search information of the deleted VTS is recorded of the reserved area of the VMGI. In addition, it is possible to create the VMG to include only the location information about the area to which the search information of the deleted VTS is recorded in the reserved area of the VMGI.

Figure 4:
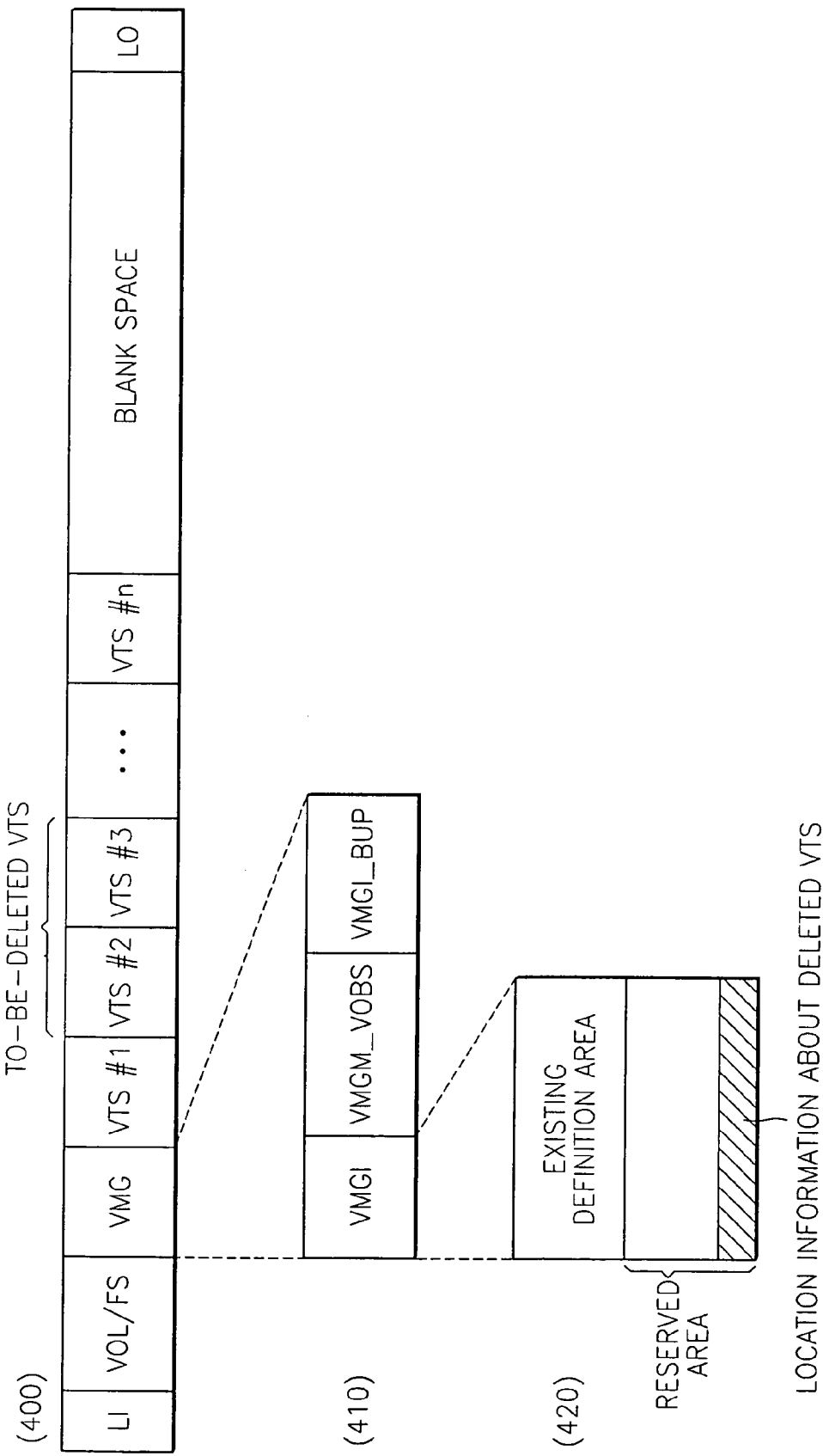
FIG. 4 illustrates a data structure of a medium according to still another embodiment of the present invention.

FIG. 4 illustrates a data structure of a medium according to still another embodiment of the present invention. The data structure of the medium includes a data structure of a volume space 400, a data structure of a VMG 410, and a data structure of a VMGI 420.

Location information about the deleted VTS is recorded on the reserved area of the VMGI as shown in 420 of FIG. 4. The location information is information used to play the deleted VTS. The location information may be identical to the search information recorded on the blank space in 300 of FIG. 3. Thus, the start addresses of the VTS #2 and VTS #3 can be found using the location information recorded to the reserved area of the VMGI. In addition, it is possible to create the VMG to include flag information indicating the presence or absence of the deleted VTS as well as the location information in the reserved area of the VMGI, in the same manners as presented with respect to FIGS. 2 and 3.

Figure 5:
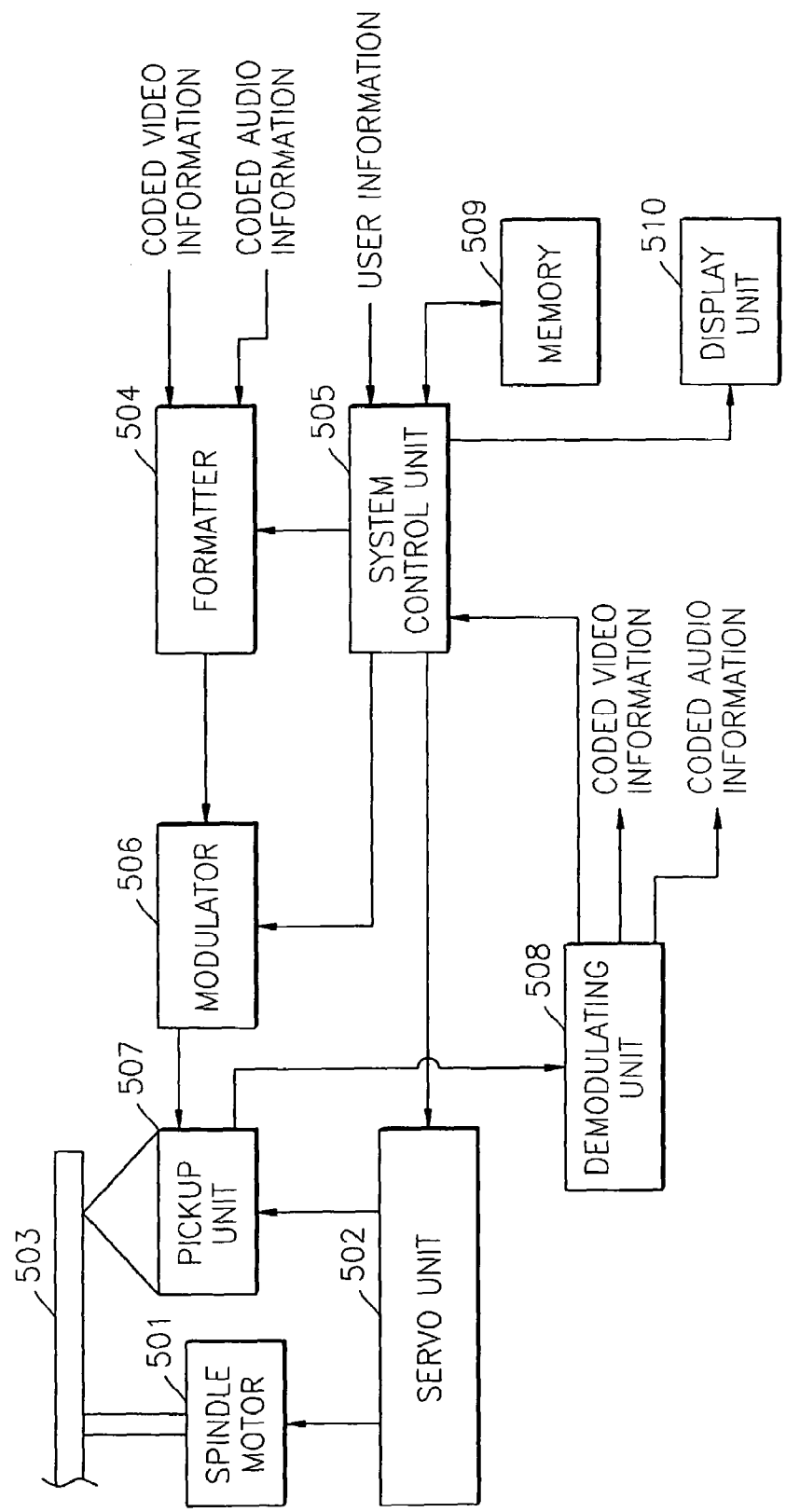
FIG. 5 is a functional block diagram of a medium drive according to the present invention.

FIG. 5 is a functional block diagram of a medium drive according to the present invention. Referring to FIG. 5, the medium drive includes a spindle motor 501, a servo unit 502, a medium 503, a formatter 504, a system control unit 505, a modulator 506, a pickup unit 507, a demodulating unit 508, a memory 509, and a display unit 510.

The spindle motor 501 rotates the loaded medium 503 at a preset speed in response to a spindle control signal provided by the servo unit 502. The medium 503 is of a digital versatile disc type.

Once coded video information and coded audio information that are to be recorded to a data region of the medium 503 are input to the formatter 504, the formatter 504 formats and outputs the coded video information and the coded audio information such that the video information and the audio information are recorded by units of VTS as shown in FIGS. 2 through 4.

The modulator 506 modulates and outputs formatted signals output from the formatter 504, using a predetermined modulation method. The predetermined modulation method may be eight-to-fourteen modulation (EFM).

The pickup unit 507 records the coded video information and the coded audio information by units of VTS onto the medium 503 as shown in FIGS. 2 through 4 by projecting an optical beam onto the medium 503 according to the output of the modulator 506.

The servo unit 502 controls movement of the pickup unit 507 in the same manner as those of conventional DVD drives.

If the user requests deletion of a VTS while data is recorded onto the medium 503 by units of VTS or after all n VTS are recorded onto the medium 503, the system control unit 505 detects the VTSI of the VTS or creates search information about the to-be-deleted VTS, and outputs the detected VTSI or the created search information to the modulator 506 and controls the servo unit 502 so that the pickup unit 507 is moved to the blank space of the medium 503. The modulator 506 modulates and transmits the detected VTSI or the created search information. Then the pickup unit 507 projects an optical beam onto the medium 503 to record the VTSI or the search information to the blank space.

If the user requests deletion of a plurality of VTS, whenever the user requests deletion of a VTS, the system control unit 505 reads the VTSI or the search information recorded on the medium 503 using the pickup unit 507 and receives the VTSI or the search information processed by the demodulating unit 508.

The demodulating unit 508 restores a radio-frequency signal picked up from the medium 503 by the pickup unit 507 into the original form and transmits restored data to the system control unit 505. The system control unit 505 transmits the restored data, received from the demodulating unit 508 and the detected VTSI or the created search information, to the modulator 506 so that the restored data and the VTSI or the location information can be recorded on the blank space of the medium 503. Here, the system control unit 505 can create search information or the VTSI about the deleted VTS such that ID also can be recorded on the blank space of the medium 503 as shown in 200 of FIG. 2.

When the user requests deletion of a VTS, the system control unit 505 may store the detected VTSI or the created search information in the memory 509, read information stored in the memory 509 and record the read information onto the blank space, and then finalize recording of the medium 503 or opening of the medium drive. When the user requests opening of the medium drive, the VMG is not created because recording of the medium has not yet been finalized.

During finalization of recording of the medium, the system control unit 505 creates the VMG and the FS. The VMG is created to include location information about the deleted VTS in the reserved area of the VMGI as shown in 220 of FIG. 2, 320 of FIG. 3, and 420 of FIG. 4. If the location information is recorded in the same manner as that of 420 of FIG. 4, the location information about the deleted VTS has not been recorded onto the blank space of the medium 503. The created VMG and FS are recorded onto the medium 503 by the modulator 506 and the pickup unit 507.

When the medium 503 is played, if the user requests playing of the deleted VTS, the system control unit 505 determines whether the deleted VTS is present in the medium 503 based on the location information or the flag information recorded on the reserved area of the VMGI of the VMG picked up by the pickup unit 507. If the location information or the flag information recorded to the reserved area of the VMGI is "0", the system control unit 505 determines that the deleted VTS is absent from the medium 503. If the location information or the flag information recorded to the reserved area of the VMGI is not "0", the system control unit 505 determines that the deleted VTS is present in the medium 503.

If the deleted VTS is present in the medium 503, the system control unit 505 displays the presence of the deleted VTS on the display unit 510 and informs the user of the presence of the deleted VTS. If the deleted VTS is absent from the medium 503, the system control unit 505 does not display a message on the display unit 510 or displays the absence of the deleted VTS on the display unit 510 so as to inform the user of the absence of the deleted VTS.

Then the system control unit 505 searches an area on the medium 503 on which the search information about the deleted VTS is recorded using the location information. If the search information about the deleted VTS is found, the system control unit 505 picks up the search information using the pickup unit 507, searches an area on which the deleted VTS is recorded based on the picked-up search information, and controls playing of the medium 503.

If the search information about the deleted VTS is recorded to the VMGI, the system control unit 505 searches an area on which the deleted VTS is recorded based on the search information included in the VMGI.

If the deleted VTS is absent from the medium 503, the system control unit 505 plays data recorded to the medium 503.

Figure 6:
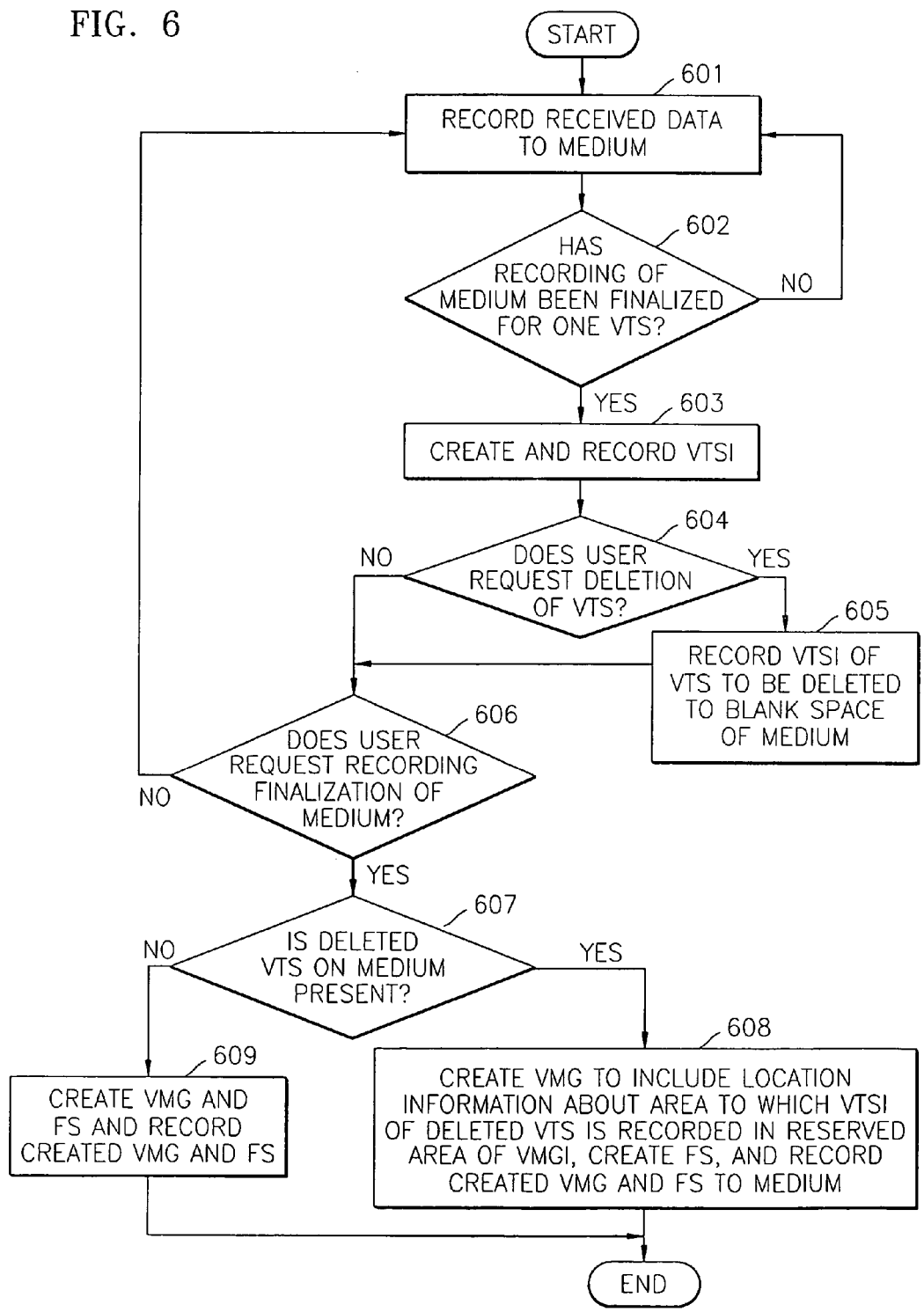
FIG. 6 is a flowchart describing a method of managing a title of a medium according to an embodiment of the present invention.

FIG. 6 is a flowchart describing a method of managing the title of the medium according to one embodiment of the present invention.

In operation 601, the system control unit 505 controls the servo unit 502, the formatter 504, and the modulator 506 to record received data onto the medium 503.

In operation 602, the system control unit 505 determines whether recording of the medium is finalized for one VTS.

If recording of the medium has been finalized for one VTS in operation 602, the system control unit 505 creates and records VTSI of the VTS in operation 603.

In operation 604, the system control unit 505 determines whether the user requests deletion of a VTS that has been recorded to the medium 503.

If the user requests deletion of the VTS, in operation 605, the system control unit 505 records VTSI of the to-be-deleted VTS to the blank space of the medium 503 in the same manner as shown in FIG. 5.

Then, in operation 606, the system control unit 505 determines whether the user requests finalization of recording of the medium. In operation 604, if the user does not request deletion of a VTS, the system control unit 505 determines whether the user requests finalization of recording of the medium.

If the user does not request finalization of recording of the medium in operation 606, the system control unit 505 proceeds to operation 601.

However, in operation 606, if the user requests finalization of recording of the medium, the system control unit 505 determines whether the deleted VTS is present in the medium 503 in operation 607. At this time, the system control unit 505 can check if the user has requested deletion of the VTS. If the deleted VTS is present in the medium 503, the system control unit 505 creates VMG to store the location information about an area to which the VTSI of the deleted VTS is recorded in the reserved area of the VMGI, creates FS, and records the created VMG and FS to the medium 503. The location information about an area on which the VTSI of the deleted VTS is recorded may be included in the reserved area of the VMGI in the format shown in 220 of FIG. 2. Once recording of the medium is finalized, the system control unit 505 completes the operation.

If the deleted VTS on the medium 503 is absent, the system control unit 505 creates the VMG not to store the location information in the reserved area of the VMGL. Then the system control unit 505 records the created VMG and FS on the medium 503. Once recording of the medium 503 is finalized, the system control unit 505 completes the operation.

In FIG. 6, the VTSI of the deleted VTS is recorded on the blank space of the medium 503. However, instead of the VTSI, the search information about the deleted VTS may be recorded on the blank space of the medium 503. In addition, when the VMG is created, not only the search information but also the flag information indicating the presence or absence of the deleted VTS can be included in the reserved area of the VMGI.

Figure 7:
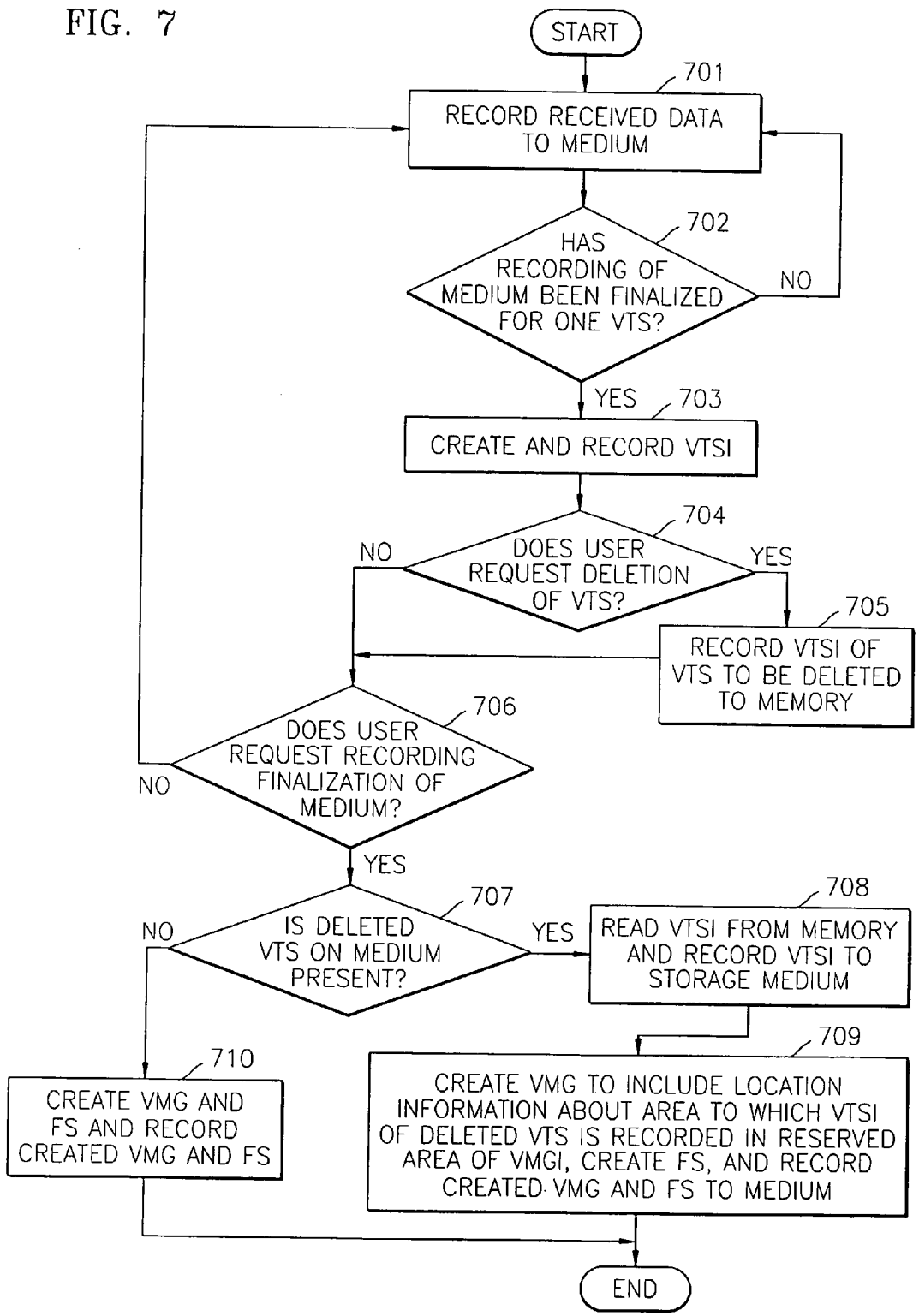
FIG. 7 is a flowchart describing a method of managing a title of a medium according to another embodiment of the present invention.

FIG. 7 is a flowchart describing a method of managing a title of a medium according to another embodiment of the present invention.

In operation 701, the system control unit 505 controls the servo unit 502, the formatter 504, and the modulator 506 to record received data onto the medium 503.

In operation 702, the system control unit 505 determines whether recording of the medium is finalized for one VTS.

If recording of the medium 503 has been finalized for one VTS, the system control unit 505 creates and records VTSI of the VTS in operation 703.

In operation 704, the system control unit 505 determines whether the user requests deletion of a VTS. At this time, the to-be-deleted VTS has been recorded to the medium 503.

If the user requests deletion of a VTS, the system control unit 505 stores VTSI of the VTS to the memory 509 in operation 705. If the user does not request deletion of a VTS, the system control unit 505 proceeds to operation 706.

Then, in operation 706, the system control unit 505 determines whether the user requests finalization of recording of the medium.

If the user does not request finalization of recording of the medium 503, the system control unit 505 returns in operation 701.

However, if the user requests finalization of recording of the medium 503, the system control unit 505 determines whether the deleted VTS is present in the medium 503. At this time, the system control unit 505 can check if the user has requested deletion of the VTS. If the deleted VTS on the medium 503 is present, the system control unit 505 reads the VTSI of the VTS on the medium 503 from the memory 509 and records the VTSI to the blank space of the medium 503.

Then the system control unit 505 creates the VMG to include the location information about an area on the medium 503 to which the VTSI of the deleted VTS is recorded in the reserved area of the VMGI, creates FS, and records the created VMG and FS to the medium 503. The location information about an area on the medium 503 to which the VTSI of the deleted VTS is recorded may be included in the reserved area of the VMGI in the format shown in 220 of FIG. 2. Once the recording of the medium is finalized, the system control unit 505 completes the operation.

If the deleted VTS on the medium 503 is absent, the system control unit 505 creates the VMG not to include the location information about the VTSI in the VMGI and creates the FS. Then the created VMG and FS are recorded on the medium 503. Once recording of the medium 503 is finalized, the system control unit 505 completes the operation.

In FIG. 7, the VTSI of the deleted VTS is recorded on the blank space of the medium 503. However, instead of the VTSI, the search information about the deleted VTS may be recorded on the blank space of the medium 503. In this case, the search information about the deleted VTS is stored in the memory 509. In addition, when the VMG is created, not only the search information but also the flag information indicating the presence or absence of the deleted VTS can be included in the reserved area of the VMGI.

In FIGS. 6 and 7, the information about the deleted VTS is stored in the blank space of the medium 503. However, the location information about the deleted VTS may be stored only in the reserved area of the VMGI as shown in FIG. 4. In this case, if the user requests deletion of the VTS, the location information about the VTS is stored in the memory 509, and the VMG is created to store the location information stored in the memory 509 in the reserved area of the VMGI.

In addition, if the user requests deletion of a plurality of VTS, whenever the user requests deletion of a VTS, operations 604 and 605 of FIG. 6 or operations 704 and 705 of FIG. 7 can be repeated.

Figure 8:
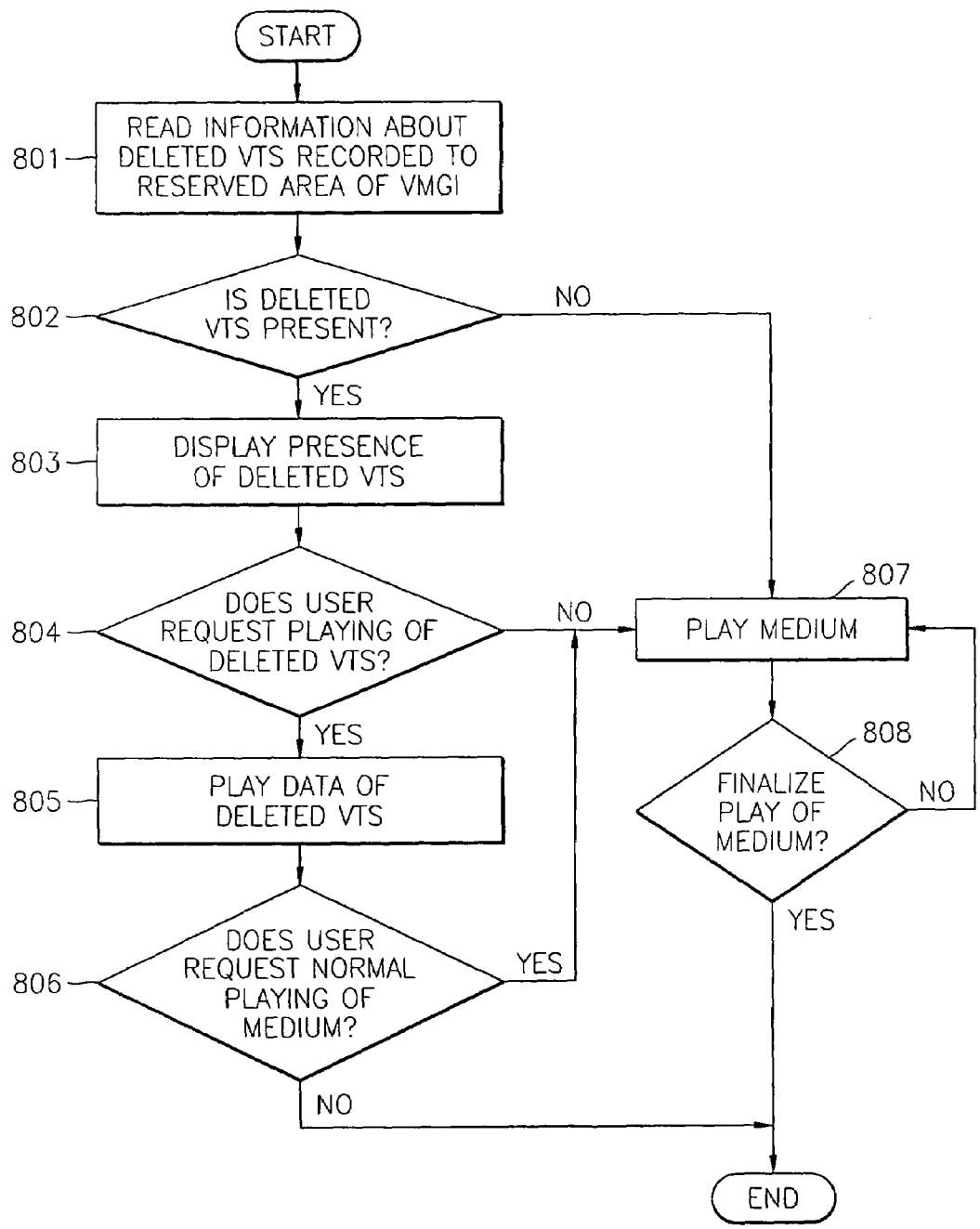
FIG. 8 is a flowchart describing a method of playing a title of a medium according to the present invention.

FIG. 8 is a flowchart describing a method of playing a title of a medium according to the present invention.

Once the medium 503 is loaded into a drive, information about the deleted VTS, recorded to the reserved area of the VMGI of the medium 503, is read in operation 801. The information may be search information about the deleted VTS or location information about an area on the medium 503 on which VTSI information is recorded or the search information about the deleted VTS or the search information recorded or the location information and flag information indicating the presence or absence of the deleted VTS. In addition, if the VTSI or the search information of the deleted VTS are recorded on the reserved area of the VMGI, information read from the reserved area of the VMGI is the VTSI or the location information of the deleted VTS.

In operation 802, the information read from the reserved area of the VMGI is analyzed to determine whether the deleted VTS on the medium 503 is present. If the information is "0", the deleted VTS on the medium 503 is absent. If the information is not "0", the deleted VTS on the medium 503 is present.

If the deleted VTS on the medium 503 is present, a message can be displayed on the display unit 510 to inform the user of the presence of the deleted VTS in operation 803.

In operation 804, it is determined whether the user requests playing of the deleted VTS.

If the user requests playing of the deleted VTS, the system control unit 505 normally plays data of the deleted VTS in operation 805. In other words, the system control unit 505 moves the pickup unit 507 to an area on the blank space of the storage medium 503 to which information about the VTS is recorded based on the location information recorded on the reserved area of the VMGI and picks up the VTSI or the location information of the deleted VTS recorded on the area of the medium 503. Then the system control unit 505 searches for a start address of the deleted VTS based on the picked up VTSI or location information. Once the start address of the deleted VTS is found, data recorded of the deleted VTS is read and played after being processed by the demodulating unit 508.

At this time, if the information about the deleted VTS is recorded only on the reserved area of the VMGI, the start address of the area on the medium 503 on which the deleted VTS is recorded, is found based on the information recorded on the reserved area of the VMGI and then the deleted VTS is played.

In operation 806, it is determined whether the user requests playing of VTSes other than the deleted VTS. If the user does not request playing of VTSes other than the deleted VTS, playing of the medium 503 is finalized. However, if the user requests playing of VTSes other than the deleted VTS, the VTSes recorded to the medium 503, other than the deleted VTS, are played normally in operation 807.

If the deleted VTS on the medium 503 is absent or the user does not request playing of the deleted VTS, the VTSes other than the deleted VTS are played normally in operation 807.

In operation 808, the user requests playing finalization of the medium 503, the system control unit 505 finalizes playing of the medium 503. However, if the user does not request finalization of playing of the medium 503, the system control unit 505 returns to operation 807 and continuously controls playing of the medium 503.

As described above, information about a VTS deleted before finalization of the medium is recorded on a blank space of the medium and a reserved area of the VMGI or only on the reserved area of the VMGI and managed. Therefore, it is possible to play the deleted VTS whenever the user desires to play the deleted VTS even after finalization of recording of the medium.

The aforementioned method of managing a title of a medium may be embodied as a computer program that can be run by a computer, which can be a general or special purpose computer. Thus, it is understood that the medium drive can be such a computer. Codes and code segments, which constitute the computer program, can be easily reasoned by a computer programmer in the art. The program is stored in a computer readable medium readable by the computer. When the program is read and run by a computer, the method of managing a tile is performed. Here, the computer-readable medium may be a magnetic recording medium, an optical recording medium, or firmware.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A computer-readable medium storing a computer program, comprising:
   a first area recording video title sets; and
   a second area recording search information used to play a deleted video title set among the video title sets that have been recorded on the first area before recording of the medium is finalized.

2. The computer-readable medium of claim 1, wherein the second area uses a blank space of the medium.

3. The computer-readable medium of claim 1, wherein the search information on the second area is included in a video manager (VMG) zone created in the medium.

4. The computer-readable medium of claim 3, wherein the search information is recorded on a reserved area of video manager information (VMGI) of the VMG zone.

5. The computer-readable medium of claim 4, wherein the reserved area of the VMGI further includes flag information indicating a presence or absence of the deleted video title on the medium.

6. The computer-readable medium of claim 5, wherein location information about the deleted video title set if stored only in the reserved area of the VMGI.

7. A medium drive of claim 6, wherein if the location information about the deleted VTS is stored only in the reserved area of the VMGI, a start address of an area of the medium on which the deleted VTS is recorded, is found on the information recorded on the reserved area of the VMGI and the deleted video title set is played.

8. The computer-readable medium of claim 1, wherein the search information is video title set information (VTSI) included in the deleted video title set.

9. The computer-readable medium of claim 1, wherein the search information is start address information of the deleted video title set.

10. The computer-readable medium of claim 1, wherein the second area further includes identification information indicating that the search information is used to play the deleted video title set.

11. A computer-readable medium causing a processor to execute a program, comprising:
- a first area recording first data in units of video title sets; and
- a video manager (VGM) zone recording second data including search information used to search for a deleted video title set from the medium before recording of the medium is finalized.

12. The computer-readable medium of claim 11, wherein the search information is recorded to a reserved area of video manager information (VMGI) of the VMG zone.

13. The computer-readable medium of claim 12, wherein the reserved area further includes flag information indicating presence or absence of the deleted video title on the medium.

14. A method of managing a title of a medium on which data is recorded in units of video title sets, the method comprising:
- recording information used to play a to-be-deleted video title set on an area of the medium if a user requests deletion of at least one video title set from the medium; and
- creating video manager (VMG) data including search information on the area of the medium and recording the created VMG data on the medium if the user requests finalization of recording of the medium.

15. The method of claim 14, wherein the area of the medium is a blank space of the medium.

16. The method of claim 14, wherein the search information is recorded on a reserved area of video manager information (VMGI) of the VMG data.

17. The method of claim 14, wherein the VMG data further includes flag information indicating a presence or absence of a deleted video title set on the medium.

18. A method of managing a title of a medium to which data is recorded in units of video title sets, the method comprising:
- storing information to play a to-be-deleted video title in a memory included in a medium drive on which the medium is loaded if a user requests deletion of at least one title set from the medium;
- reading the information from the memory and recording the information on an area of the medium if the user requests finalization of recording of the medium; and
- creating video manager (VMG) data including search information and recording the VMG data to the medium.

19. The method of claim 18, wherein the area of the medium is a blank space of the medium.

20. The method of claim 18, wherein the search information is recorded on a reserved area of video manager information (VMGI) of the VMG data.

21. A method of playing a title of a medium to which data is recorded in units of video title sets and information to play deleted video titles, the method comprising:
- determining whether a deleted video title set on the medium is present based on data recorded to a video manager (VMG) zone of the medium;
- informing a user of the presence of the deleted video title set if the deleted video title set is present; and
- playing the deleted video title set based on the information if the user requests playing of the deleted video title set.

22. A medium drive that drives a medium on which data is recorded in units of video title sets, the drive comprising:
- a pickup unit recording the data to the medium and reading the data recorded on the medium;
- a servo unit controlling movement of the pickup unit on the medium; and
- a system control unit creating information to play a video title set deleted from the medium and transmitting the created information to the pickup unit while controlling the servo unit to record the created information to a blank space of the medium.

23. The medium drive of claim 22, wherein the system control unit creates video manager (VMG) data to include search information during finalization of recording of the medium and transmits the created VMG data to the pickup unit.

24. The medium drive of claim 23, wherein the system control unit creates the VMG data to include the search information in a reserved area of video manager information (VMGI) of the VMG data.

25. The medium drive of claim 23 further comprising a display unit displaying the presence of a deleted video title set on the medium, wherein the system control unit controls the display unit based on a result of determining a presence of the deleted video title using the search information in VMG.

26. A medium drive that drives a medium on which data is recorded in units of video title sets (VTS), the drive comprising:
- a pickup unit recording the data to the medium and reading the data recorded on the medium;
- a servo unit controlling movement of the pickup unit on the medium;
- a memory storing search information used to search a video title set among video title sets deleted from the medium; and
- a system control unit storing the search information in the memory if a user requests deletion of the video title set from the medium, creating video manager (VMG) data including the search information stored in the memory, and transmitting the VMG data to the pickup unit during finalization of recording of the medium.

27. The medium drive of claim 26, wherein if the user requests deletion of the video title sets while data is recorded onto the medium or after all the video title sets have been recorded onto the medium, the system control unit detects a VTSI of the video title sets and outputs the detected VTSI to the modulator and controls the servo unit so that the pickup unit is moved to the blank space of the medium.

28. The medium drive of claim 26, wherein if the user requests deletion of the video title sets while data is recorded onto the medium or after all the video title sets have been recorded onto the medium, the system control unit creates search information about the to-be-deleted video title sets and outputs the created search information to the modulator and controls the servo unit so that the pickup unit is moved to the blank space of the medium.

29. The medium drive of claim 26, further comprising a demodulating unit which restores a signal picked up from the medium by the pickup unit into restored data and transmits the restored data to the system control unit.

30. The medium drive of claim 29, wherein the system control unit transmits the restored data, received from the demodulating unit, to the modulator so that the restored data is recorded onto the blank space of the medium.

31. The medium drive of claim 30, wherein the system control unit creates search information or VTSI related to the deleted video title set, such that an ID is recorded on the blank space of the medium.

32. A medium drive of claim 26, wherein the search information is start address information of the deleted video title set.

33. A computer-readable medium encoded with computer executable instructions to cause a processor to execute a method of playing a title of a medium to which data is recorded in units of video title sets and information to play deleted video titles, the method comprising:
   determining whether a deleted video title set on the medium is present based on data recorded to a video manager (VMG) zone of the medium and informing a user of the presence of the deleted video title set if the deleted video title set is present; and
   playing the deleted video title set based on the information if the user requests playing of the deleted video title set.

34. A computer-readable medium encoded with computer executable instructions to cause a processor to execute a method of managing a title of a medium on which data is recorded in units of video title sets, the method comprising:
   recording information used to play a to-be-deleted video title set on an area of the medium if a user requests deletion of at least one video title set from the medium; and
   creating video manager (VMG) data including search information on the area of the medium and recording the created VMG data on the medium if the user requests finalization of recording of the medium.

35. The computer-readable medium of claim 34, wherein the area of the medium is a blank space of the medium.

36. The computer-readable medium of claim 34, wherein the search information is recorded on a reserved area of video manager information (VMGI) of the VMG data.

37. The computer-readable medium of claim 34, wherein the VMG data further includes flag information indicating a presence or absence of a deleted video title set on the medium.

* * * * *